Aug. 12, 1969  M. T. KENNEDY, JR., ET AL  3,460,988
PROCESS AND APPARATUS FOR SPRAY TREATING THE BOUNDARY SURFACES
OF ENCLOSURES, SUCH AS TANKS AND THE LIKE
Filed March 21, 1966  2 Sheets-Sheet 1

INVENTORS
MERRITT T. KENNEDY, JR
JOHN DINEEN

BY
*Augustus Somma*
ATTORNEY

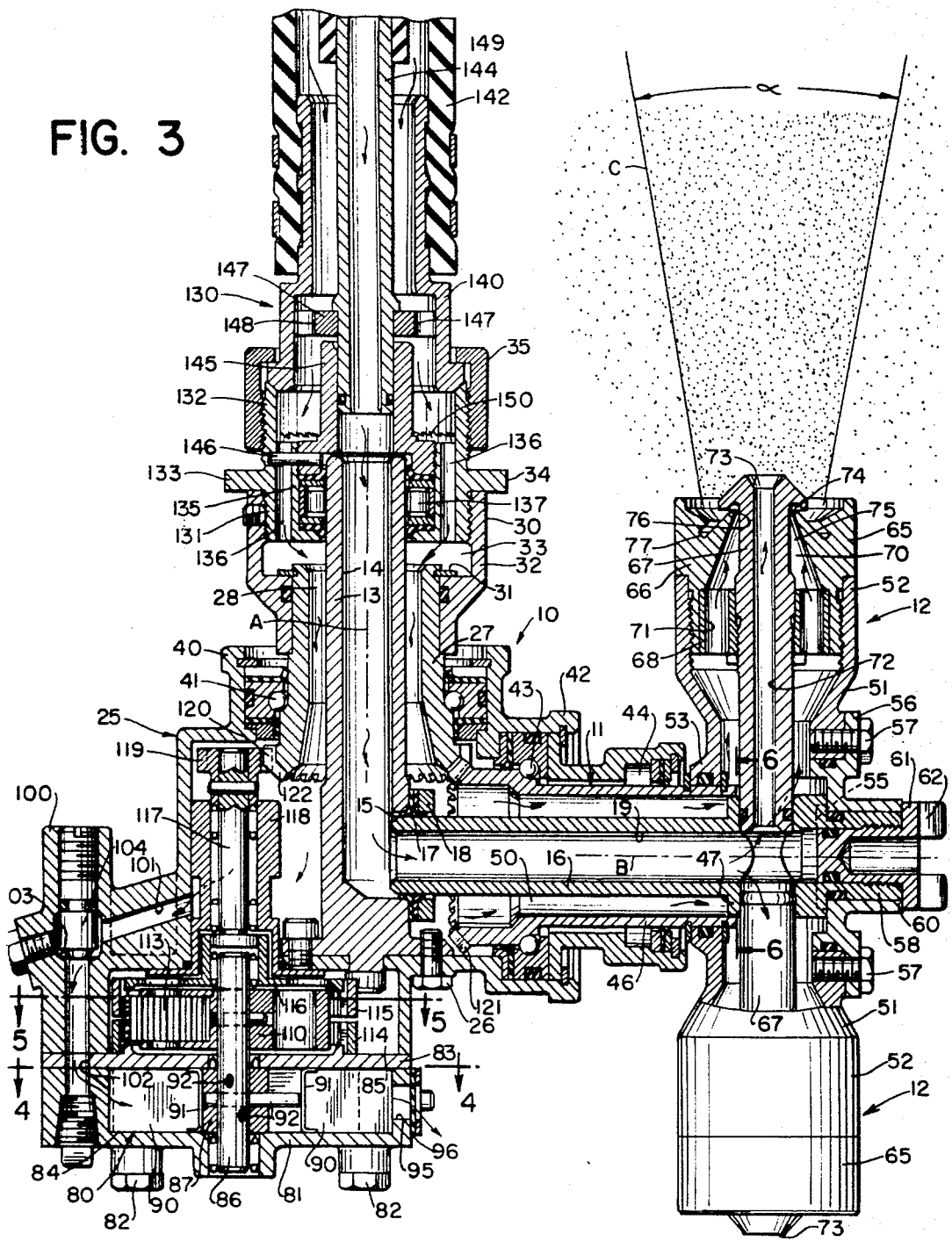

United States Patent Office 3,460,988
Patented Aug. 12, 1969

3,460,988
PROCESS AND APPARATUS FOR SPRAY TREATING THE BOUNDARY SURFACES OF ENCLOSURES, SUCH AS TANKS AND THE LIKE
Merritt T. Kennedy, Jr., Port Washington, and John Dineen, East Northport, N.Y., assignors to Pyrate Sales, Inc., Bayside, N.Y., a corporation of Nevada
Filed Mar. 21, 1966, Ser. No. 535,938
Int. Cl. B08b 9/08
U.S. Cl. 134—1
19 Claims

ABSTRACT OF THE DISCLOSURE

Process and apparatus by which the walls of an enclosure, such as a tank, may be treated, as for cleaning, wherein an atmosphere of ambient aerosol fog is created in the enclosure, and there is projected through said ambient fog and against the walls of said enclosure a fog beam, while said beam is gyrated in a direction to traverse said walls. The apparatus comprises a turret rotatable about a first axis and a sonic spray nozzle on said turret rotatable about a second axis at right angles thereto. A first passageway extends centrally along the first axis and along the second axis to the sonic nozzle and a second annular passageway around said first passageway concentric therewith extends along said first and second axes to the sonic nozzle, one of said passageways being adapted to conduct liquid, the other passageway being adapted to conduct a gas.

---

Figure 6:
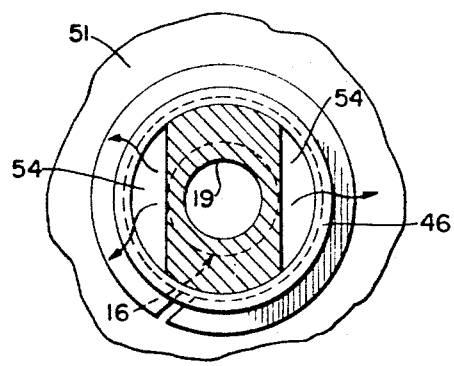
Figure 1:
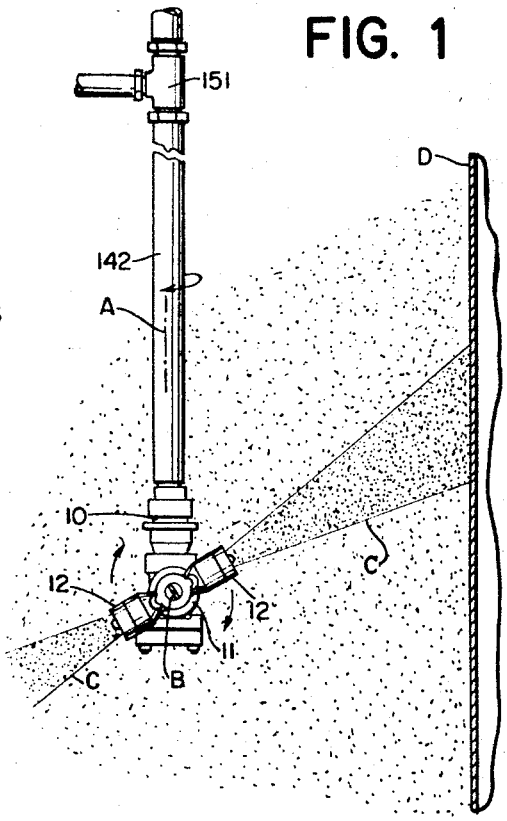

The present invention relates to a process and apparatus for spray treating the boundary surfaces or walls of enclosures, such as tanks.

Machines have been used for cleaning tank walls with liquids, in which one or more nozzles rotate bodily about a vertical axis while at the same time rotating about a horizontal axis. A machine of this general type is exemplified in the Kennedy et al. Patent No. 2,714,080. In this construction, the liquid is projected as a solid liquid stream against the surface to be cleaned.

It is alo known to use sonic energy for liquid spray operations. Methods and apparatus employing such a technique are illustrated in United States Patent Nos. 2,519,619; 3,070,313; 3,081,946, and in the Fortman Application Ser. No. 449,189 filed Apr. 19, 1965 now Patent No. 3,297,255. In this technique, gas, such as air, under pressure is introduced into a sonic generator and is emitted therefrom as sonic waves of compression and rarefaction. A liquid is fed into the sonic field where the energy waves break up and atomize the liquid into an aerosol.

Sonic spraying units of the known type described produce a fog while the unit is stationary.

It has been found in accordance with the present invention that a sonic spray unit operated to project continuously a directional spray beam or jet of comparatively small angle from a nozzle or nozzles against the encompassing walls of an enclosure, while the nozzles are being turned about two axes substantially perpendicular to each other, will produce some unusual, highly desirable effects, resulting in highly efficient treatment of the walls, with minimum waste of materials.

In the operation of the sonic spray unit in accordance with the present invention, there is produced in the enclosure, an ambient fog, and in this ambient foggy mass, there is directionally projected against the walls of the enclosure, a fog beam of comparatively small angle, which is impacted against the walls and which traverses the walls as the result of the simultaneous bi-axial movements of the spray unit. This movement of a directional, sharply-defined fog beam in an ambient fog atmosphere results in the following advantages.

A directional, sharply-defined fog beam of comparatively small angle, projected against the walls of an enclosure, will impact the walls with greater force than will a fog generated in a 360° disc shaped pattern or in a comparatively wide angle. It has been found in accordance with the present invention, that in a fog beam having the wide angle characteristics described, the velocity of the stream drops off very sharply after being exhausted from the nozzle. The resulting fog has substantially no motion or turbulence and is substantially static in nature. The surface tensions of the fog particles of such small dimensions created by this technique under these conditions are so great, that even the liquid in the layer of fog contacting the walls of a tank or other enclosure would not be precipitated on these walls. Moreover, in such wide angle beam projection, the actual liquid touching the walls of an enclosure is a small part of the actual amount of liquid generated. Almost all of the liquid remains in suspension in the gas, and ultimately is precipitated onto the floor of the tank or other enclosure, before reaching the side walls of the enclosure.

The projection of a comparatively small angle, well-defined beam, as for example, a conical beam of about 20°, against enclosure walls, causes all of the liquid to reach the walls, and the impact is such as to precipitate a substantial amount of the liquid on the walls, so that more effective use of this liquid is made. Moreover, the velocity with which the entrained liquid particles in such a beam strikes the enclosure walls, causes these particles to overcome the surface tension of these particles and to consequently adhere to the impacted walls. Some of the fog rebounding from the surface forms an ambient fog and also circulates and ricochets into contact with the shadow or blind spots or inaccessible areas of the walls, such as reinforcing structural members or columns, adjoining the areas of the walls directly impinged by the fog beam, thereby assuring complete effective treatment of all areas of the walls and their supporting and reinforcing structures.

Moreover, the projection of a well-defined, directional fog beam of comparatively small angle through an ambient fog and the movement of such a beam through the ambient fog mass, causes the ambient fog to circulate as the result of the cutting action of this beam through this mass, and as a result of the aspirating effect this beam has on the foggy mass, thereby delaying the precipitation of the liquid in the ambient fog to the bottom of the enclosure, so that greater utilization of the fog is achieved. At the same time, the presence and circulation of the ambient fog in the enclosure, maintains the walls of the enclosure wet with ambient fog continuously circulating in contact therewith. This serves to maintain these areas of the enclosure walls wet with treating material from the fog, while other areas are being directly impinged by the fog beams, thereby (1) increasing the effective period of wall treatment, (2) subjecting areas of the walls to preliminary treatment before the fog beam impinges these wall areas, so that these wall areas are rendered more amenable to the direct impingement action of the fog beam, and (3) preparing these wall areas for greater adherence and precipitation of the liquid from the fog beam thereon when the fog beam reaches these areas.

The technique by which a fog beam is projected in a field of ambient fog can be utilized in a manner to delay or prevent premature drying of any atomized solid material that may be carried by the fog beam. For that purpose, for example, at the beginning of fogging operations, the fog generated may contain a solvent for the atomized solid particles. An ambient fog is thereby created carrying an excess of this solvent, so that the drying of the particles during the generation of the fog beam is inhibited.

The present invention can be utilized for different purposes, where it is desired to treat the walls of an enclosure such as a tank. For example, it can be employed for removing from the walls of a tank, the layer of liquid derived from a previous cargo, such as crude oil, lubricating oil, bunker oil, gasoline, furnace oil, Diesel fuel, vegetable or edible oil, etc. in preparation for a fresh or different cargo of liquid. In conjunction with a gaseous material, such as air or steam, there may be employed for this cleaning purpose, any well-known cleaning liquid, as for example, detergents, emuslifiers, solvents, bond releasing agents, alkalized solutions and acid solutions. For example, amine-amido sulfonates, such as those sold under the trademark Navy 24–Penetone, trisodium phosphate or kerosene, may be employed as the cleaning liquid.

In connection with the cleaning operations described, air or steam at 100 p.s.i. at a rate of 100 cubic feet per minute may be discharged through each sonic nozzle, while the cleaning liquid may be delivered to this sonic nozzle for atomization at a rate of 1 gallon per minute through each nozzle.

The present invention can also be employed for the purpose of applying protective coatings to the enclosure walls. The coating materials for that purpose may constitute, as for example, inorganic zinc coatings, such as basic zinc silicate complexes, epoxy resins, such as those sold under the trademark Devran by Devoe & Reynolds, zinc epoxys, cosmoline, and all types of paint and paint products. These coatings may be employed as corrosion controls or to preserve the quality or purity of a cargo against contamination from rust and the like on the walls of the enclosure.

The present invention can also be employed for the purpose of treating the enclosure walls with rust inhibiting solutions, such as sodium nitrites solutions or with rust removal solutions, such as hydrochloric acid and sulfuric acid solutions.

In all of these phases of the present invention, the proportions of gas and liquid or solid, and the pressures of the gases depend on the character of operations to be performed, and the determination of these pressures and proportions and the selection of the proper liquid or solid are well within the ken of those skilled in the art.

Besides the method described, the present invention relates to a new and improved type of spray machine biaxially operable. In accordance with the present invention, the spray machine provides for the passage of liquid and gas through separate conduits thereof and utilizes at least some of the gas to produce driving power for the spray machine.

Various other features and advantages of the invention are apparent from the following description and from the accompanying drawings, in which FIG. 1 is a side elevational view of a two nozzle spray machine, which embodies the structural features of the present invention and which is shown in operation carrying out the method of the present invention;

FIG. 2 is a diagram of an impingement pattern of two beams from the two nozzles of the spray machine projected through successive phases on a horizontal section of a wall being treated by the process shown in FIG. 1;

FIG. 3 is a vertical section of a spray machine, which embodies the structural features of the present invention and which can be used to carry out the method of the present invention;

FIG. 4 is a section of the spray machine taken on lines 4—4 of FIG. 3;

FIG. 5 is a section of the spray machine taken on lines 5—5 of FIG. 3; and

FIG. 6 is a section of the spray machine taken on lines 6—6 of FIG. 3.

Referring to the drawings, there is shown a sonic spray machine comprising a turret 10 adapted to be driven about a vertical axis A in the operation of the machine. This turret 10 carries a nozzle arm 11 rotatable with said turret head about this vertical axis A and also rotatable about an axis B at right angles to the axis A. The nozzle arm 11 rigidly carries two sonic spray nozzle units 12 diametrically arranged with respect to the axis B. The spray machine is provided with inner and outer conduits for the separate passage of the treating liquid and of an atomizing gas under pressure therethrough to the nozzle units 12, as will be described more fully hereinafter.

The turret 10 comprises a hollow shaft 13 adapted to extend vertically in the operation of the spray machine, and having a center hollow 14 therealong serving as an inner conduit for the passage of liquid therethrough. This vertical shaft 13, on one side, near its lower end has an opening 15 receiving the end of a horizontal tubular fitting 16, which is sealed to said shaft by means of a seal 17, held in operative position by a retainer ring 18, secured to said shaft by screws (not shown), and which forms part of the nozzle arm 11, as to be movable with said arm bodily about the vertical axis A and rotatable about the horizontal axis B. The tubular fitting 16 has a center hollow 19 therealong in communication with the hollow 14 of the vertical shaft 13 to form an inner conduit for the passage of the liquid therethrough.

A housing 25, forming part of the turret 10, and enclosing the drive mechanism for the turret, is secured to the lower end of the vertical turret shaft 13 by means of screws 26. This housing 25 is rotatably supported on a stationary tubular support 27 encircling the vertical turret shaft 13 and peripherally spaced therefrom to form an outer annular conduit or passage 28 for the gas. This turret support 27 extends at its upper end into a stationary tubular fitting 30 with a snug conforming sealing fit and is secured thereto by a snap ring 31. This tubular fitting 30 at its upper end has a tubular head 32 peripherally spaced from the vertical shaft 13 to form an outer annular gas conduit or passage 33 in communication with the outer gas passage 28, and is internally threaded to receive an adapter 34 for a hose coupling 35 to be described hereinafter.

The housing 25 has an upper tubular neck 40 encircling the stationary tubular support 27 and supported thereon by a ball bearing unit 41 for rotation with the shaft 13 about said support and about the axis A. The housing 25 also has a tubular side extension 42 encircling the nozzle arm 11 and supporting it through anti-friction bearings 43, and 44, to permit the nozzle arm 11 to rotate with the turret 10 about its vertical axis A and at the same time, about its own horizontal axis B.

Encircling the horizontal tubular fitting 16 and forming part of the nozzle arm 11 is a hollow shaft 46 supported on the side tubular extension 42 of the housing 25 by means of the anti-friction bearings 43 and 44 for rotation about the horizontal axis B, while said shaft rotates bodily about the vertical axis A. The end of the horizontal tubular fitting 16 furthest from the vertical axis A, has a boss 47 extending radially outwardly from the main tubular body to the inner periphery of the horizontal shaft 46, to center said fitting with respect to said shaft. The horizontal shaft 46 is radially spaced from the tubular fitting 16 to form therewith an anular gas passageway 50 in communication with the outside gas passageway 28.

The two sonic spray nozzle units 12 include a nozzle carrier 51 having two similar diametrically opposed tubular sections 52, radiating from a center hub 53 into which one end of the horizontal shaft 46 extends with a snug sealing connection. The boss 47 is circular in cross-section except for two diametrical opposed sections, cut away to form with the inner periphery of said shaft, two opposed chordal openings 54 establishing communication between the outside gas passageway 50 and the hollow of the tubular nozzle sections 52. These cut-aways fall short of the end of the boss 47 to form at the end of said boss as part thereof a circular flange 55 against which abuts a hub cover 56, secured to the center hub section of the nozzle carrier 51 by screws 57. The horizontal shaft 46 terminates at one end beyond the boss 47 into a tubular extension 58 of reduced diameter extending with a snug fit through a hub section 60 of the cover 56. A plug 61 is screwed into this shaft extension 58 and terminates at its outer end into a pair of finger plug-turning wings 62.

Mounted in each of the tubular sections 52 of the nozzle carrier 51 is a sonic spray nozzle 65. This spray nozzle 65 comprises a housing 66 threaded into the outer end of a corresponding tubular section 52 and a tubular stem 67 extending through the center of the housing and secured therein by a threaded engagement between said stem and a spider 68 rigidly secured in said housing. The housing 66 forms an annular gas passageway 70 around the stem and the spider 68 has a series of holes 71 therein to permit gas flow through said passageway. The tubular stem 67 extends snugly into a round hole in the boss 47 with a sealing connection, and has a hollow 72 in communicaiton with the hollow 19 of the horizontal tubular fitting 16 for the passage of the treating liquid therethrough.

The outer end of the tubular stem 67 terminates in a head 73 serving as a reverser or resonator and defining a resonator cavity 74. The inside of the housing 66 defines around the stem 67 the annular gas passage 70 tapering towards the resonator 73 and terminating in a restricted annular orifice 76 leading into the cavity 74, so that the pressure energy of the gas is converted into a velocity energy as it passes through said orifice into said cavity. The gas emitted as a supersonic jet stream from the orifice76 is compressed in the resonator cavity 74, as explained in the aforesaid U.S. Patent Nos. 2,519,619; 3,070,313 and 3,081,946 and is reversely directed from said cavity toward an annular conical well 77 in the nozzle housing 66. The jet stream is emitted from the well 77 as sonic waves of compression and rarefaction having desirably inaudible frequencies above 10,000 cycles per second, as for example, those in the supersonic range and having a well-defined conical beam configuration of small angle $\alpha$, desirable in the order of about 10 to 50° and preferably about 20°. The liquid discharged from the stem 67 is injected into the high energy sonic field generated. This field fragments the liquid into a fine aerosol, in which the liquid is broken up into a fog, carried as a directional beam or jet C of the stated configuration towards the enclosure walls to be treated.

For driving the turret 10, as well as the nozzle arm 11 about the vertical axis A and for driving at the same time the nozzle arm about the horizontal axis B, there is provided a drive mechanism operated from a gas motor 80, powered by part of the gas supplied to the spray machine to form the directional fog beams C ejected from the nozzles 65. The gas motor 80 comprises a housing 81, secured to the lower end of the housing 25 constituting part of the turret 10, by means of screws 82, and separated therefrom by a plate 83 to define two superposed chambers 84 and 85. The lower chamber 84 is circular and encloses the operating parts of the gas motor 80, while the upper chamber 85 encloses part of the drive mechanism between the gas motor and the turret 10.

A vertical motor shaft 86 passes eccentrically through the motor chamber 84 and passes also through the upper chamber 85 and has centrally keyed or otherwise rigidly secured thereto a circular rotor 87 located in said motor chamber. This rotor 87 is smaller in diameter than the chamber 84 and, therefore, is eccentrically positioned in said chamber.

The rotor 87 has a series of equally spaced radial slots 88, six being shown, arranged in diametrically aligned pairs. Slidable in these slots 88 respectively are blades 90, each being engaged at its radially inner end with a bearing clip 91. A series of equally spaced dowel pins 92, three being shown, slidably pass diametrically through the motor shaft 86. Each dowel pin 92 bears against the clips 91 of a pair of diametrically aligned blades 90 and are long enough to position these blades in substantially sealing engagement with diametrically opposite side walls of the housing 81, in one angular position of these blades in relation to the housing; in other angular positions of diametrically aligned blades 90, centrifugal force on these blades assures sealing contact thereof with opposite side walls of the housing.

The housing 81 forms with the eccentrically mounted rotor 87 a crescentic space 93, and the housing has an inlet 94 for the gas under pressure entering into a narrow section of the space and has an outlet 95 opposite the widest section of the space closed by a filter 96. The gas under pressure admitted in the space 93 expands and acting on the blades 90 drives the rotor 87.

The speed of the gas motor 80 can be controlled by controlling the pressure of the motive gas admitted therein through the inlet 94. For that purpose, the housing 25 has an annex 100 communicating with the interior of the main part of said housing by means of a passageway 101 in communication with the gas passageways around the turret shaft 13 and defining a gas supply valve passage 102 leading to the motor inlet 94. This valve passage 102 has a valve seat 103 cooperating with a valve member 104 threaded in said valve passage and having a slotted head to permit it to be turned with a screwdriver. The valve member 104 can be set to admit gas to the gas motor under controlled pressure according to the desired speed of rotation of the turret 10 about the vertical axis A.

The gas motor 80 drives the shaft 86, which in turn drives the turret 10 through a drive mechanism, comprising a pinion carrier 110 in the chamber 85 pinned to said shaft and having journalled in two opposed flanges 112 thereof, the shaft of a pinion 113 meshing with two superposed ring gears 114 and 115. The ring gear 114 is affixed to the plate 83, while the ring gear 115 is driven, and for that purpose, is secured to a hub 116, which in turn is secured to the lower end of a vertical rotatable shaft 117, carried by the housing 25 of the turret 10 and supported in a bearing 118 secured to said housing. The upper end of the shaft 117 carries a pinion 119 meshing with a fixed spur gear 120 forming part of the lower end of the stationary turret support 27. The space around the shaft bearing 118 forms a passageway for the gas between the gas passageway of the turret support 27 and the passageway 101 in the housing annex 100.

Although the two ring gears 114 and 115 have the same diametrical pitch, they differ slightly in the number of teeth. For example, the fixed gear 114 may have 81 teeth and the driven gear 115 may have 80 teeth. With this gear teeth ratio, when the pinion 113 has gone around the inside of the ring gears 114 and 115 through one complete turn about the axis of the motor shaft 86, the driven gear 115 with its shaft 117 will rotate $\frac{1}{81}$ of a revolution, and the pinion 119 will rotate the same amount about the axis of said shaft, causing said pinion to be driven along the fixed gear 120 an amount according to the diametrical pitch ratio between said pinion and said gear. Assuming in a specific embodiment of the invention, that the gear 120 has 36 teeth, and the pinion 118 meshing therewith has 12 teeth, 243 revolutions of the gas motor shaft 86 will rotate the pinion three revolutions about its own axis and one revolution about the vertical turret axis A. Since the pinion shaft 117 is carried by the housing 25 of the turret 10, the rotation of this shaft about the turret axis A drives the turret 10 with it about said axis.

The rotation of the turret 10 about the vertical axis A, causes the nozzle arm 11 carrying the nozzle units 12 to also rotate about this vertical axis, and this rotation of the nozzle arm causes the nozzle arm with its nozzle units to rotate at the same time about the horizontal axis B. The drive for rotating the nozzle arm 11 about the horizontal axis B comprises a bevel gear 121 forming an integral part of the horizontal rotatable shaft 46 at one end thereof and meshing with a fixed bevel gear 122 forming an integral part of the lower end of the fixed turret support 27. The movement of the nozzle arm 11 about the vertical turret axis A drives the gear 121 along the fixed gear 122, and causes thereby the shaft 46 to rotate about the horizontal axis B. This causes the nozzle units 12 to rotate about the horizontal axis B, while moving about the vertical turret axis A.

If the number of teeth in the two gears 121 and 122 were the same, for every revolution of the nozzle units 12 about the vertical turret axis A, the nozzle units would make one revolution about the horizontal axis B. Therefore, if a fog jet or beam from a single nozzle 65 impinges on a selected area of a wall at the beginning of a revolution of the turret 10 about its vertical axis A, the beam would impinge on the same selected area at the end of this revolution, and at the end of all subsequent revolutions, so that only a single stripe area of the wall would be covered by direct impingement of a fog beam from each nozzle, and the same area would be covered by successive revolutions of the turret 10 about its vertical axis.

To attain coverage of substantially the entire wall area of the enclosure by successive revolutions of the turret 10 about its vertical axis, the gear teeth in the two meshing bevel gears 121 and 122 differ by a small number. For example, the fixed bevel gear 122 has 36 teeth, and the bevel gear 121 meshing therewith has 34 teeth. Therefore, for every revolution of the turret 10 about the vertical axis A, the nozzles 65 will rotate $1\frac{1}{18}$ of a revolution about the horizontal axis B. That extra $\frac{1}{18}$ of a revolution of the nozzles 65 about the horizontal axis B for every revolution of the turret 10 about the vertical axis A causes each nozzle to generate eighteen successive impingement stripe convolutions on the enclosure walls, phasically offset from each other before the convolutions start repeating themselves. This assures substantially complete coverage of the walls by direct impingement of the fog beam C thereon from each nozzle 65, and more so by both nozzles.

Figure 2:
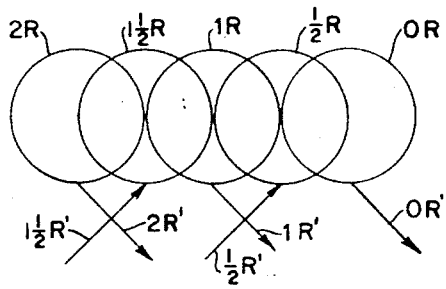
Figure 5:
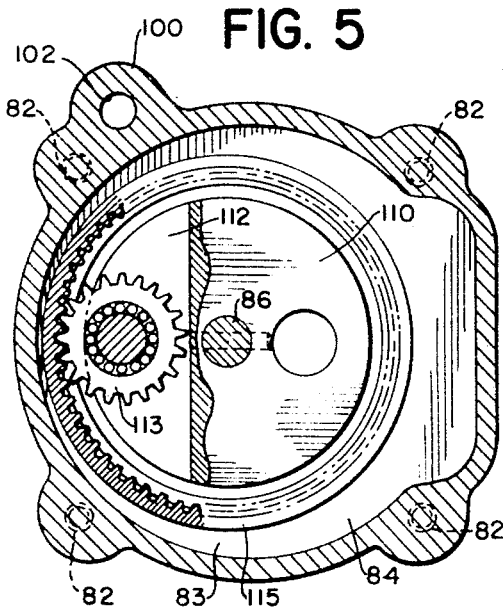
Figure 4:
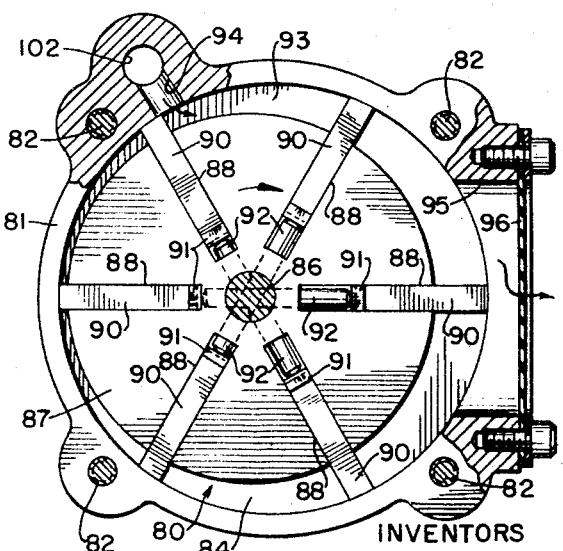

FIG. 2 shows approximately the pattern of impingement of the fog beam C from one nozzle on a wall of the tank or other enclosure being treated, ignoring the offset of the nozzle in relation to the vertical turret axis A, its displacement effect on the wall being very small. The round areas indicated are the areas impinged by the nozzle 65 on a horizontal region of the tank wall D. The successive areas are indicated with the numerals 0R, ½R, 1R, 1½R and 2R, indicating impingement at 0, ½, 1, 1½ and 2 revolutions respectively of the turret 10 about the vertical axis. The corresponding directions of movements of the areas 0R, ½R, 1R, 1½R and 2R, are indicated by the arrows 0R', ½R', 1R', 1½R' and 2R' respectively.

If it is assumed that in one original phase position of the spray machine, the fog beam C from a nozzle 65 impinges an area of the tank wall D, shown as area 0R, then as the turret 10 rotates about the vertical axis A and the nozzles 65 rotate about the horizontal axis B, the impingement area 0R moves along the wall D approximately in the inclined direction 0R'. At the end of one-half revolution of the turret 10 about the vertical axis A, the fog beam from this same nozzle 65 moving in the inclined direction ½R', will impinge an area of the wall D, shown as area ½R, displaced horizontally from area 0R, a distance of about one-half the width of the area. At the end of the first revolution of the turret 10 about the vertical axis A, the fog beam C from the same nozzle 65, moving in the inclined direction 1R', impinges on an area of the wall D shown as area 1R, substantially tangentially to the area 0R. At the end of one and one-half revolution of the turret 10 about the vertical axis A, the beam from the same nozzle 65 moving in the inclined direction 1½R' will impinge on an area of the wall, shown as area 1½R, substantially tangential to the area ½R. At the end of the second revolution of the turret 10, about the vertical axis A, the fog beam from the same nozzle 65 moving in the inclined direction 2R' impinges on an area of the wall D, shown as area 2R, substantially tangential to the area 1R. The successive impingements of the fog beam C for one nozzle 65 on the tank wall D, phasically offset as described, will be continued during 18 revolutions of the turret 10 about the vertical axis A before being repeated, while the other nozzle 65 is creating the same impingement pattern on the opposite wall.

For operation, the spray machine described is secured to a hose assembly 130 adapted to deliver treating liquid and gas under pressure, such as air or steam, through separate concentric annular chambers to the spray machine, and is suspended therefrom in a tank to be treated. The hose assembly 130 is secured to the fixed adapter 34, which has two tubular sections 131 and 132, separated by a flange 133, which is adapted to be seated against the end of the fixed tubular fitting 30. The lower tubular section 130 is externally threaded and screwed into the upper section of the fixed tubular fitting 30, and the upper tubular section 132 is also externally threaded to receive the coupling collar 35 screwed onto said tubular section 132, and forming part of the hose assembly 130. A spider 135 between the hub and the peripheral wall of the adapter 34 has a series of arcuate holes 136 for the passage of the gas therethrough, and carries an anti-friction bearing 137 for the upper section of the shaft 13.

The hose assembly 130 comprises a hose nipple 140 having a lower flanged end clamped between the upper end of the adapter 34 and a flange on the coupling collar 35. A resilient hose 142 is clamped to the nipple 140. A hose nipple 144 inside the hose nipple 140 and hose 142 has its lower end fitted snugly with a sealing fit into the upper end of a nipple 145 secured to the adapter 34 by screwing and by means of the pin 146, and is centrally spaced by a spider 147 with gas holes 148 between the nipples 140 and 144. A resilient hose 149 inside the hose 142 is secured to the upper end of the hose nipple 144. A filter screen 150 is placed around the nipple 145 for the gas.

A T-fitting 151 delivers gas under pressure to the hose assembly 130 for passage along the outside of the central hose 149 and nipple 144, while the treating liquid is separately delivered along the inside of said hose 149.

In operation, the spray machine is lowered through an opening in the top of a tank or other enclosure whose walls are to be cleaned or otherwise treated, until the machine is at a desired level in said tank. The necessary valves are then opened to deliver gas, such as compressed air or steam and the treating liquid to the spray machine through the hose assembly 130, for separate passage through said machine to the nozzles 65. Under these conditions, the turret 10 rotates about the vertical axis A, while the nozzles 65 rotate about said axis and at the same time about the horizontal axis B. At the same time, the directional fog beams or jets C of comparatively small angle, desirably in the order of about 20°, are generated and projected from the two nozzles 65 against the walls of the enclosure. Soon after the start of operations, an ambient fog is created in the tank or enclosure filling the enclosure, and the directional beams C projected through this ambient fog and against the walls of said enclosure, while the geams are gyrating about two axes at right angles to each other, thereby maintain the ambient fog in the state of turbulence, and maintain the fog in the state of suspension. The precipitation of the ambient fog to the bottom of the enclosure is thereby delayed, thereby prolonging the effectiveness of the ambient fog.

The ambient fog wets and preliminarily treats the regions of walls of the enclosure before the directional impinging beams C reach these walls, thereby enhancing the desirable effects of these impinging beams on said walls.

The finely atomized liquid particles carried by the high velocity gas currents in the directional beams C after they are impacted against a wall are ricocheted by the impacted wall and are carried to otherwise inaccessible parts of the wall structure adjacent to the impacted areas, thereby assuring treatment of these wall structure parts.

The ambient fog as described, can be utilized as a carrier of a solvent to delay drying of solids, in case such solids are employed in solution, as the liquid medium. For that purpose, the spraying operation can be carried initially with the solvent alone or in excess amounts to create the conditions indicated. After the ambient solvent fog has been created, the normal spraying operations, with the desired proportion of treating liquid is then commenced.

The treating operation can be carried out and completed with the spray machine in one position in the tank or enclosure, or the position of the spray machine can be changed elevationally or horizontally, after periods of operation of said spray machine, according to the size or shape of the tank and the degree of intensity of treatment desired.

While the invention has been described with particular reference to a specific embodiment, it is to be understood that it is not to be limited thereto but is to be construed broadly and restricted solely by the scope of the appended claims.

What is claimed is:

1. The method of treating the walls of an enclosure comprising creating in the enclosure an atmosphere of ambient aerosol fog and projecting an aerosol fog beam through said ambient fog and against said walls while gyrating said beam in directions to cause said beam to traverse said walls.

2. The method as described in claim 1, said ambient aerosol fog and said aerosol fog beam being created by injection of liquid into a high intensity sonic energy field.

3. The method as described in claim 1, wherein said beam is gyrated about two axes substantially at right angles to each other.

4. The method as described in claim 1, wherein said fog beam is gyrated to effect movements of said beam about two axes substantially at right angles to each other, the rates of gyration about one axis relative to the rate of gyration about the other axis being such as to generate a first series of successive impingement stripe convolutions on said walls phasically offset from each other before this series of successive impingement stripe convolutions is repeated and superposed on the first series.

5. The method as described in claim 1, said ambient aerosol fog and said aerosol fog beam being created by injection of liquid into a high intensity sonic energy field, and said beam is gyrated to effect movements of said beam about two axes substantially right angles to each other, the rates of gyration about one axis relative to the rate of gyration about the other axis being such as to generate a first series of successive impingement stripe convolutions in said walls phasically offset from each other, before this first series of successive impingement stripe convolutions is repeated.

6. The method as described in claim 1, wherein the ambient aerosol fog is created by the same gas-liquid mixture that creates the aerosol fog beam.

7. The method as described in claim 1, wherein the ambient aerosol fog is initially created by a gas-liquid mixture in which the liquid is predominately a solvent for a wall-treating solid and wherein the aerosol fog beam is subsequently generated with a gas-solid-liquid mixture, in which the liquid is the solvent for the solid and said solid is soluble in the liquid contained in said ambient fog.

8. The method as described in claim 1, wherein the fog beam is a conical beam of comparatively small angle in the order of about 10 to 50°.

9. The method as described in claim 1, wherein the non-gaseous ingredient of the fog beam is of the class consisting of a wall cleaning ingredient, a rust-inhibiting ingredient, a rust removing ingredient and an ingredient applying a protective coating to the walls.

10. A spray machine comprising a turret mounted for rotation about a first axis, a sonic spray nozzle supported on said turret for rotation about said axis and for rotation about a second axis substantially at right angles to said first axis, means for driving said turret about said first axis and for driving at the same time said nozzle about said second axis, and means for conducting a gas fluid and a liquid fluid through said machine to said sonic spray nozzle, to generate at said nozzle a directional fog beam in which the liquid fluid is entrained and projected as a fine mist, said conducting means comprising a first passageway extending centrally along said turret and said first axis and then, centrally along said second axis to said spray nozzle for one of said fluids, and a second annular passageway around said first passageway concentric therewith and extending along said second axis to said spray nozzle for the other of said fluids.

11. A spray machine as described in claim 10, wherein said sonic spray nozzle comprises means for creating from the gas conducted therethrough a high intensity sonic energy field, and means for injecting said liquid into said field to break said liquid into a micromist and projecting it in the form of a directional fog cone of small angle.

12. A spray machine as described in claim 10, comprising means for utilizing at least a part of the gas conducted through said spray machine as the motive power for said driving means.

13. A spray machine comprising a turret mounted for rotation about a first axis, a sonic spray nozzle supported on said turret for rotation about said axis and for rotation about a second axis substantially at right angles to said first axis, means for driving said turret about said first axis and for driving at the same time said nozzle about said second axis, means for conducting a gas and a liquid through separate passageways through said machine to said sonic spray nozzle, to generate at said nozzle a directional fog beam in which the liquid is entrained and projected as a fine mist, and means for utilizing at least a part of the gas conducted through said spray machine as the motive power for said driving means and comprising a rotary gas motor including a housing, a shaft in said housing eccentrically located, a rotor connected to said shaft and eccentrically located in said housing, to define with the peripheral wall of said housing a progressively increasing gas expansion chamber, said housing having an inlet leading to the smaller section of said chamber and an outlet at the larger end of said chamber, and vanes carried by said rotor and travelling cyclically along said expansion chamber by the driving action of the expanding gas thereon.

14. A spray machine comprising a turret mounted for rotation about a first axis, a sonic spray nozzle supported on said turret for rotation about said axis and for rotation about a second axis substantially at right angles to said first axis, means for driving said turret about said first axis and for driving at the same time said nozzle about said second axis, means for conducting a gas and a liquid through separate passageways through said machine to said sonic spray nozzle, to generate at said nozzle a directional fog beam in which the liquid is entrained and projected as a fine mist, and means for utilizing at least a part of the gas conducted through said spray machine as the motive power for said driving means and comprising valve means for adjusting the admission of the motive gas to said gas motor to control the speed of said motor.

15. A spray machine comprising a turret mounted for rotation about a first axis, a spray nozzle supported on said turret for rotation about said axis and for rotation about a second axis substantially at right angles to said first axis, conduit means for conducting a fluid through said turret for ejection from said nozzle in the form of a jet, a rotary motor, a drive mechanism between said motor and said turret comprising a motor shaft, a pinion carrier secured to said shaft for rotation therewith, a pinion journalled in said carrier and having its axis parallel to the axis of said shaft and spaced therefrom, a pair of gears meshing with said pinion, one of said gears being fixed relative to said turret, the other being driven, said gears differing in the number of teeth by a small amount, whereby for every revolution of said pinion about said shaft axis, the driven gear rotates a small part of a revolution corresponding to the number of teeth difference between said gears, a drive connection between said driven gear and said turret to rotate said turret about said first axis, and a drive connection between said turret and said nozzle for driving said nozzle about said second axis while rotating about said first axis.

16. A spray machine as described in claim 15, said gears comprising ring gears with internal teeth, said pinion being located inside said gears.

17. A spray machine as described in claim 15, said drive connection between said driven gear and said turret comprising a fixed tubular support for said turret defining part of said conduit means for said fluid and having an annular gear rigidly secured thereto, a shaft rigid with said driven gear and carried by said turret, the latter shaft having an axis substantially parallel to said first axis and spaced therefrom, and a pinion on the latter shaft meshing with said annular gear.

18. A spray machine as described in claim 15, the drive connection between the turret and the nozzle comprising a nozzle arm connecting said nozzle to said turret and including a tubular shaft defining part of said conduit means for said fluid and extending along said second axis, and intermeshing annular gears rigidly secured to said tubular support and said tubular shaft respectively.

19. A spray machine comprising a fixed tubular support, a turret supported on said support for rotation about a first axis along said support, a nozzle, a nozzle arm connecting said nozzle to said turret for rotation with said turret about said first axis and rotatable about a second axis substantially at right angles to said first axis, and including a tubular shaft extending along said second axis, conduit means for conducting a fluid through said machine for ejection from said nozzle in the form of a jet, and comprising said tubular support and said tubular shaft, a rotary motor, drive means between said motor and said turret for driving said turret about said first axis and comprising a turret shaft carried by said turret and having its axis parallel to and spaced from said first axis, a gear secured to said turret shaft and a fixed annular gear rigidly secured to said support and extending concentrically around said first axis, said gears intermeshing, and means for driving said tubular shaft about said second axis as said turret rotates about said first axis and comprising a pair of intermeshing annular gears secured to said tubular support and said tubular shaft respectively and coaxial with said first and second axes respectively.

References Cited

UNITED STATES PATENTS

| 2,714,080 | 7/1955 | Kennedy et al. | 134—24 |
| 3,281,269 | 10/1966 | Watts | 134—1 |
| 3,371,869 | 3/1968 | Hughes | 239—4 X |

MORRIS O. WOLK, Primary Examiner

J. D. OLSEN, Assistant Examiner

U.S. Cl. X.R.

134—24, 168; 239—4, 102, 227